United States Patent
Duca

(10) Patent No.: US 9,092,596 B2
(45) Date of Patent: Jul. 28, 2015

(54) COMPUTER SYSTEM FOR PREVENTING THE DISABLING OF CONTENT BLOCKING SOFTWARE FUNCTIONALITY THEREIN, AND METHOD THEREFOR

(71) Applicant: Frederick J. Duca, Marshall, VA (US)

(72) Inventor: Frederick J. Duca, Marshall, VA (US)

(73) Assignee: Onyx Protected Systems, LLC, Warrenton, VA (US)

( * ) Notice: Subject to any disclaimer, the term of this patent is extended or adjusted under 35 U.S.C. 154(b) by 148 days.

(21) Appl. No.: 13/871,024

(22) Filed: Apr. 26, 2013

(65) Prior Publication Data
US 2014/0325665 A1    Oct. 30, 2014

Related U.S. Application Data
(60) Provisional application No. 61/645,661, filed on May 11, 2012.

(51) Int. Cl.
    *G06F 7/04*      (2006.01)
    *G06F 21/00*      (2013.01)

(52) U.S. Cl.
    CPC ..................................... *G06F 21/00* (2013.01)

(58) Field of Classification Search
None
See application file for complete search history.

(56) References Cited

U.S. PATENT DOCUMENTS

| | | | |
|---|---|---|---|
| 6,065,055 A * | 5/2000 | Hughes et al. | 709/229 |
| 6,065,056 A | 5/2000 | Bradshaw et al. | |
| 6,795,856 B1 | 9/2004 | Bunch | |
| 7,689,666 B2 * | 3/2010 | Commons | 709/217 |
| 8,156,317 B2 * | 4/2012 | Esliger et al. | 713/2 |
| 8,516,235 B2 * | 8/2013 | Bhansali et al. | 713/2 |
| 8,527,728 B2 * | 9/2013 | Clerc et al. | 711/165 |
| 2005/0080898 A1 | 4/2005 | Block | |
| 2006/0235960 A1 * | 10/2006 | Lai et al. | 709/224 |
| 2012/0011497 A1 * | 1/2012 | Moon et al. | 717/174 |
| 2013/0145476 A1 * | 6/2013 | Rive et al. | 726/26 |
| 2013/0151835 A1 * | 6/2013 | Fontignie et al. | 713/2 |

* cited by examiner

*Primary Examiner* — Fikremariam A Yalew
(74) *Attorney, Agent, or Firm* — Matthew J. Lattig; Charter IP, LLC

(57) ABSTRACT

In a computer system having a hard drive and a processor, operating system software stored on the hard drive and implemented by the processor, and a display on which icons, features, lists and menus representative of executable programs of the operating system software are displayable, there is a method for preventing the disabling or circumventing of content blocking software functionality to be installed in the computer system at time of manufacture. In the method, system restore is turned off prior to installation of the content blocking software onto the computer system, and then content blocking software-related features are hid once the content blocking software is installed. The method includes preventing booting of the computer system from external sources, preventing modifying of BIOS settings of the computer system, and the disabling of selected advanced troubleshooting tools in the operating system software.

16 Claims, 4 Drawing Sheets

US 9,092,596 B2

COMPUTER SYSTEM FOR PREVENTING THE DISABLING OF CONTENT BLOCKING SOFTWARE FUNCTIONALITY THEREIN, AND METHOD THEREFOR

CROSS-REFERENCE TO RELATED APPLICATION

The present application claims the benefit under 35 U.S.C. §119(e) of U.S. Provisional Patent Application No. 61/645,661 to the inventor, filed May 11, 2012, the entire contents of which is hereby incorporated by reference herein.

BACKGROUND

1. Field

Example embodiments in general relate to a computer system for preventing the disabling of content blocking software functionality therein, and a method therefor.

2. Related Art

The internet has become a dominating source of obtaining information and media for many individuals. Unfortunately, the internet is also utilized by pornographers and individuals with ill intent to provide illicit and pornographic materials. In some cases, the ease of obtaining pornographic and illicit materials on the internet has resulted in individuals, who would not otherwise be involved with such illicit or pornographic materials, becoming more interested or even addicted to the illicit or pornographic materials. These addictions are not just limited to pornographic content, but can apply to any questionable or potentially-deleterious content, such as that related to gambling for example.

In an attempt to prevent or limit access to this illicit and potentially-deleterious content, and as the internet use rose, debate over objectionable content online sparked the introduction of internet filters. Such filters restrict access to video, images and Web pages based on rules established by parents, schools and businesses. Internet filters are widely available, integrated into popular Web browsers such as Microsoft®'s Internet Explorer® and the freely available Firefox®. More elaborate Internet filtering is available for consumer purchase as a licensed download as separate applications, such as Netnanny®.

Internet filters have a variety of uses—from protecting children, limiting public access to certain sites or material, to restricting when and how employees can use the Internet while at work. Internet filters work by excluding or including content. These methods are more commonly referred to as a "black list" or "white list." As its name implies, a black list blocks all websites or material restricted by an authority. The reverse, a white list, bars access to all Internet content except items approved by the filter.

Another filtering method checks keywords entered, restricting access or completely blocking an internet user if she types prohibited or restricted words such as "sex" or controversial phrases such as "Tiananmen Square.", blocking access thereto. This option has drawn the ire of some who object that this content filtering can block access to valuable information, resources or be used to stifle political dissent.

A typical consumer internet filtering application such as Netnanny is typically downloaded and installed onto a PC or a LAN or networked PCs. The content blocking software warns or blocks access to pornography, adult/mature, hate speech, alcohol, gambling, tobacco, and up to 35 categories of content found in web pages. It also blocks questionable chat rooms, online game sites, and scans video games to permit only those that meet the user's desired Entertainment Software Rating Board (ESRB) rating. With Netnanny, a user can surf the Internet using any browser and their web activities will be filtered according to pre-determined settings.

However, for the consumer porn or gambling addict who has installed this content blocking software on their PC or laptop, and continue to struggle with their addictions, selected individuals with advanced computing skills have devised ways to disable, uninstall, or circumvent the blocking functionality. Additionally, younger generations of computer users typically exhibit a greater understanding of the operating system troubleshooting tools and also may be able to bypass or disable selected settings in the downloaded filtering application in order to circumvent selected settings thereof set by their parents, in order to view prohibited content on the internet. Even the most robust content filtering packages are not immune to compromise by the purchasing end-user.

SUMMARY

An example embodiment is directed to a computer system configured for preventing the disabling or circumventing of content blocking software functionality to be installed at time of manufacture therein. The system includes a housing, the housing enclosing a hard drive and a processor, operating system software stored on the hard drive and implemented by the processor, and a display on which icons, features, lists and menus representative of executable programs of the operating system software are displayable. The system further includes means for turning off system restore prior to installation of the content blocking software onto the computer system, means for hiding content blocking software-related features once the content blocking software is installed, means for preventing booting of the computer system from external sources, means for preventing modifying of BIOS settings of the computer system, and means for disabling selected advanced troubleshooting tools in the operating system software.

Another example embodiment is directed to that within a computer system having a hard drive and a processor, operating system software stored on the hard drive and implemented by the processor, and a display on which icons, features, lists and menus representative of executable programs of the operating system software are displayable, there is a method for preventing the disabling or circumventing of content blocking software functionality to be installed in the computer system at time of manufacture. In the method, system restore is turned off prior to installation of the content blocking software onto the computer system, and then content blocking software-related features are hid once the content blocking software is installed. The method includes preventing booting of the computer system from external sources, preventing modifying of BIOS settings of the computer system, and the disabling of selected advanced troubleshooting tools in the operating system software.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

DETAILED DESCRIPTION

Figure 1:
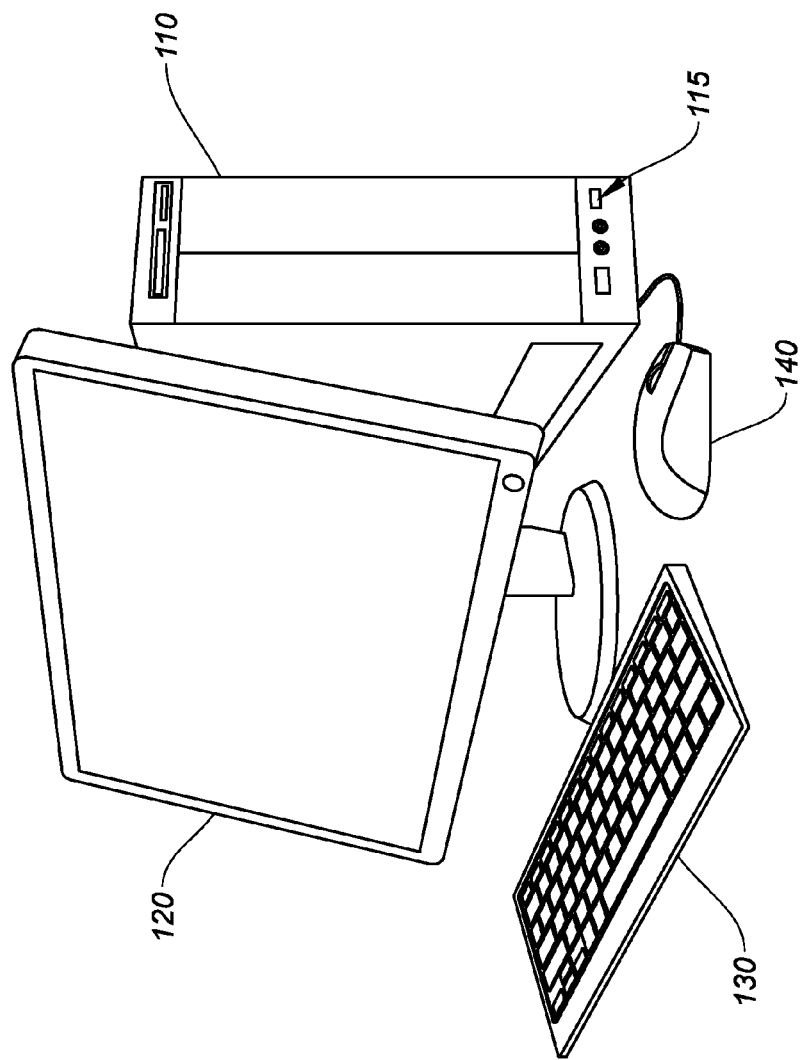
FIG. 1 is an illustration of a computer system according to the example embodiments.

As to be set forth more fully below, the example embodiments in general are directed to a computer system for preventing the disabling of content blocking software functionality therein, and a method therefor.

The example computer system described hereafter is designed for users who desire to maximize their use of technology without the worry of accessing Internet pornography. Using state of the art technology, the example computer system recognizes inappropriate content and blocks it. The system is designed to prevent even advanced computer users from disabling and/or circumventing the content blocking capability. As a result, some advanced troubleshooting tools are not available. The example computer system described hereafter may be ideal for school computer labs, students at all grade levels and for adults struggling with Internet addictions but who want to remove temptations from their computing experience.

A principle of the example embodiment is to create a computer system that blocks inappropriate content regardless of where the computer is physically located. The computer system is therefore configured so as to make it substantially difficult and time consuming for even an advanced computer user to disable, uninstall, or circumvent the content blocking functionality of the internet filter therein. Regardless of whether or not the computer is connected to a local area network (LAN) at a secondary school, to a wireless network in a home, or connected to Wi-Fi at a restaurant, etc., the content blocking functionality remains the same.

In an example, the computer system may include an off-the-shelf computer having one or more off-the-shelf content blocking or filtering software packages pre-installed therein. The blocking or filtering software includes various content blocking functionality to block the displaying of pornographic or other illicit content on a computer screen. As to be detailed below, numerous changes are then implemented to the software running on the computer to make it extremely difficult and time consuming to compromise the content blocking software functionality of the computer system.

Accordingly, and unlike conventional filtering or content blocking schemes, the effectiveness of the example computer system to block content is not dependent on the technical ability of the consumer. It is often the case that younger members of a household are more advanced from a technological standpoint than older members of that same household. However, it is the older members of the household who would normally have the wisdom to understand the need for, and the financial wherewithal to be able to purchase internet content filtering software. This dynamic invariably leads to a situation where it becomes easy for the good intentions of the purchaser to be negated by the circumventing of the blocking software by others.

Moreover, if individuals purchase and install blocking software because they want to remove the temptation to view detrimental or illicit content from their own computing experience, they can also reverse that decision and undo any positive steps taken just as easily. In order to protect themselves from doing that, they would typically have to solicit the assistance of another individual. However, this is often not an acceptable option for many people as they are embarrassed about their situation and want to keep this area of their life private.

The example computer system was developed combining standard computer hardware technology and content filtering software. Typical content filter software blocks content in a variety of categories based upon selections made by the user and also blocks images with high levels of flesh tones present. The use of security protocols (passwords) prevents unauthorized users from disabling the content blocking technology or changing the categories of content to be blocked.

The computer system described hereafter in one example may be designed primarily to block content of a sexual nature (pornography). However, it can easily be adapted to block other often harmful or illicit content such as gambling. Thus, the example system is specially configured to prevent even advanced computer users from disabling and/or circumventing the content blocking software and/or its functionality contained therein. The specific configuration settings of the system are not included here so as to prevent others from having the knowledge to disable the example computer system.

FIG. 1 is an illustration of a computer system according to the example embodiments. FIG. 1 illustrates system 100, shown in the form of an off-the-shelf, commercially available desktop personal computer system, it being understood that system 100 could be a laptop, a LAN of connected computers, and/or a wireless network of local and/or remote computing devices. In this example, system 100 includes an outer protective housing 110 which encloses a processor, operating system (OS), and memory (hard drive (ROM) and RAM). In an example, the processor may be an Intel® Core™ Processor (3.30 GHz, the OS a Windows® 7 or Windows® XP Operating System, the memory may include a minimum of 2 GB DDR3 memory (RAM) and the hard drive may be minimum of 250 GB (ROM). There may be included at least two (2) USB 2.0 ports 115, a flat screen monitor 120, and input devices such as a keyboard 130 and mouse 140.

Figure 2:
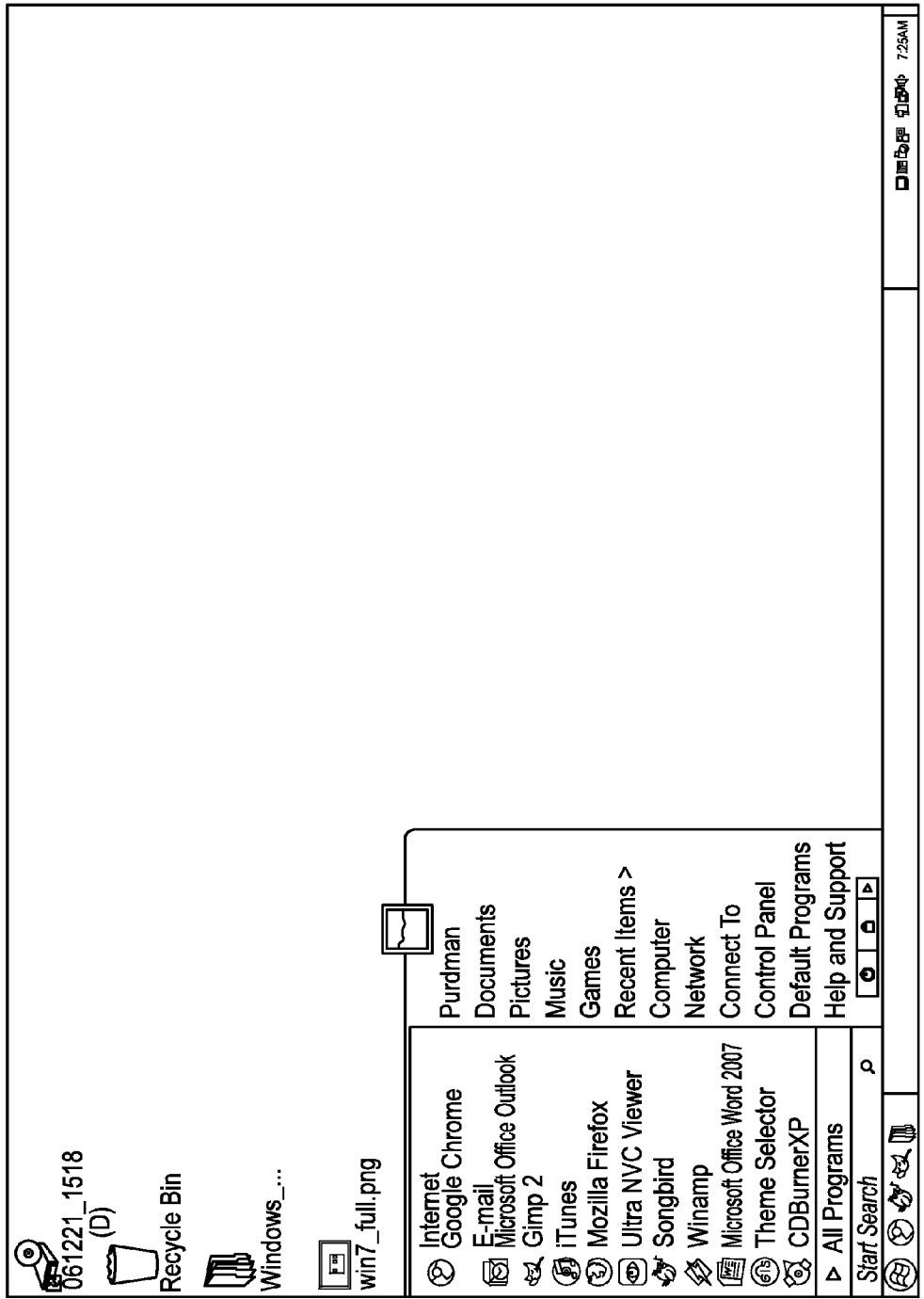
FIG. 2 is a screenshot of a desktop display of an example operating system.

FIG. 2 is a screenshot of a desktop display of an example operating system. The operating system, or OS, is a software program that enables the computer hardware to communicate and operate with the computer software. Without a computer operating system, a computer would be useless. The OS software is loaded up and stored on the hard drive within housing 110 of the computer system of FIG. 1, with the processing thereof invoked by the processor within housing 110 of the computer system 100 in FIG. 1. Windows® 7 (and its successor OS platform Windows® 8) is just one example OS that can be modified according to the example embodiments to run the example computer system 100. Windows 7 is the successor to Windows® Vista that was officially released to the public Oct. 22, 2009. FIG. 2 illustrates the well known desktop screenshot of a typical Windows 7 desktop view.

Example OS system minimum requirements may include (a) a 1 GHz processor or faster 32-bit (x86) or 64-bit (x64); (b) 1 GB of RAM for 32-bit or 2 GB of RAM for 64-bit; (c) 16 GB of hard disk space for 32-bit or 20 GB for 64-bit; and (d) DirectX 9 graphics device with WDDM 1.0 or higher.

According to the example embodiments, computer system 100 is configured with content blocking software pre-installed at time of manufacture. The pre-installed content blocking software performs the following functionality and/or exhibits the following characteristics: (1) perform categorization in real-time, as the user surfs the internet. This means the content on any given web page is determined as the user browses and doesn't rely on a set list. This technology ensures all web pages are appropriately categorized to protect web viewers, even when new content was added just seconds before viewing; (2) determines the use of words or phrases in context. For example, a search for the word "breast" could refer to cooking, breast cancer or pornography. The software is configured to discern the difference; (3) hides vulgar words the user/administrator/owner does not want children to see, but allows them to continue to read a website that is otherwise acceptable, such as a news site; (4) blocks access to pornography; and (5) works on any web browser.

Figure 3:
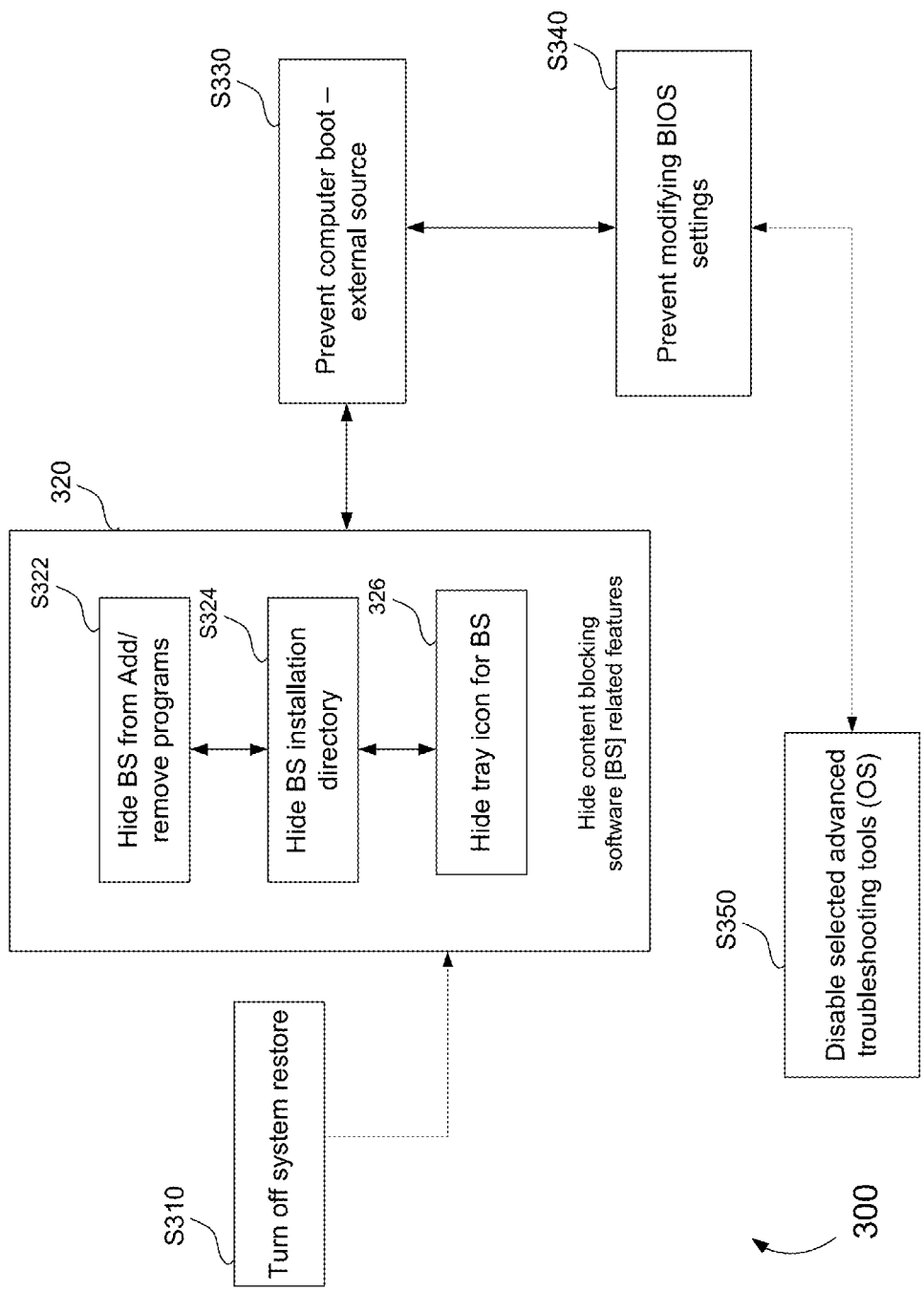
FIG. 3 is a flow diagram to illustrate a process to prevent disablement or circumvention of the content blocking functionality of the system.
Figure 4:
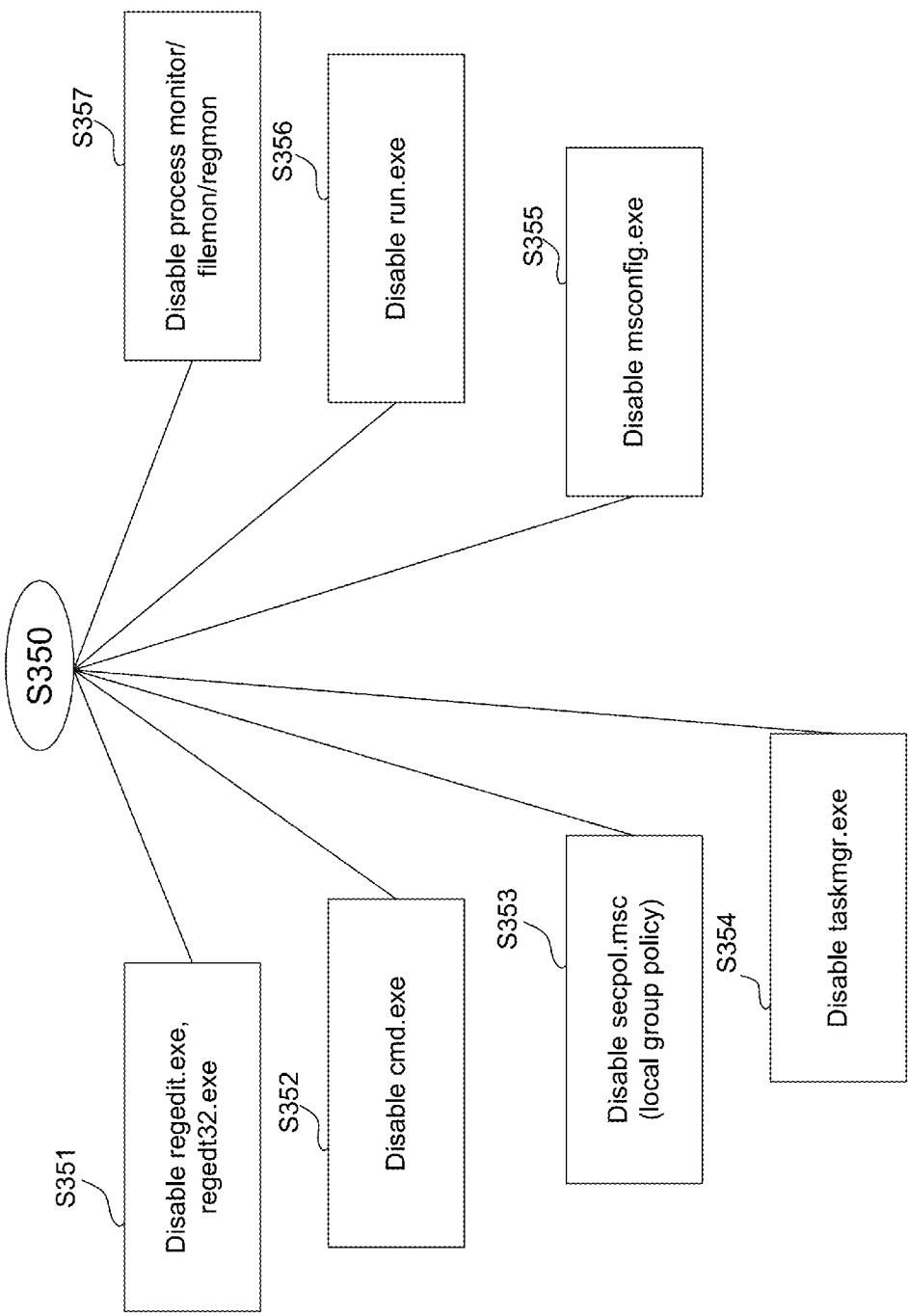
FIG. 4 is a flow diagram to illustrate the disabling functions of FIG. 3 in more detail.

FIGS. 3 and 4 are flow diagrams provided to illustrate the process invoked by the computer system 100 to prevent disablement or circumvention of the content blocking functionality of the system. Moreover, one or more features or files of the operating system (OS) software and/or content blocking software is modified so that a user is prevented from disabling and/or circumventing the content blocking software functionality in the example computer system 100. Accordingly, a regimen of hiding, preventing, turning off and disabling of certain functions and tools typically available to the user in the operating system prevents the user from compromising the content blocking functionality of the computer system 100.

Referring to FIG. 3, the general process steps in a method 300 of preventing the disabling or circumventing of content blocking software functionality in the computer system 100 includes five basic means or functions performed by computer system 100: means to turn off system restore (S310), means to hide blocking software-related features (S320), means to prevent the computer from booting from an external source (S330), means to prevent modifying BIOS settings (S340), and means to disable selected advanced troubleshooting tools typically available in the OS (S350).

System restore is shut off at S310 prior to installing the content blocking software so a user can't restore to a point in time prior to the installation of the content blocking software. This will help prevent disabling the content blocking software because if the user were to attempt to do a restore, any existing restore points on the computer would all include the content blocking software. Step S320 includes hiding the content blocking software from an Add/Remove programs list (S322) of executable programs in the OS of the computer system 100 (and which may be displayable on the flat screen monitor 120) from the user, hiding the content blocking software installation directory (S324) which is included in the OS and displayable on the flat screen monitor 120 from the user, and hiding the tray icon for the content blocking software (S326) and which is displayable on the flat screen monitor 120 from the user. These features and icons can be simply hid by modifying the computer's registry. In other words, this means deleting the key in the registry that causes the content blocking software to be listed in Add/Remove programs or Programs and Features. The reason to hide the installation directory, taskbar icons and the entry in Add/Remove programs is because it makes it much more difficult to bypass, uninstall or circumvent the blocking software if one does not even know what is doing the blocking.

External boot prevention at S330 means preventing the computer from being booted from a CD, USB, or floppy drive. This can be done by modifying settings in the computer system 100's Basic Input/Output System (BIOS). The BIOS is what loads immediately upon powering on the computer system 100 and points the machine to load the OS. The BIOS is also responsible for telling the machine to boot from a CD/DVD-ROM drive or USB drive, if the specific media is detected. For example, the BIOS boot setting can be prevented from being modified at S340 by enabling security in the BIOS and using a secure password. Enabling security in a BIOS is typically done by modifying various settings available after accessing the setup screen. By adding a password unknown to the purchaser of the system, the user can be locked out of making certain changes to the BIOS. The reason to prevent the user from booting from any media other than the computer's hard drive is because it prevents the user from installing a new operating system in an attempt to replace the operating system containing the blocking software.

The OS has several advanced troubleshooting settings or tools that typically are available to a user. FIG. 4 shows step S350 in more detail. These disabling steps are performed in no particular order at time of manufacture.

Disabling selected advanced troubleshooting tools at S350 includes disabling regedit.exe and regedt32.exe at (S351), cmd.exe (S352), secpol.msc (local group policy) at S353, taskmgr.exe (S354), msconfig.exe (S355), run command (S356), filemon/regmon/process monitor (collectively at S357). Each of these functions and the effect thereof by disablement is described briefly below. It is foreseen that the overall impact of disabling these troubleshooting tools will be negligible on overall OS and computer system 100 performances.

The Windows registry can be edited manually using regedit.exe and on older versions of Windows, regedt32.exe, although these tools do not expose some of registry's metadata such as the last modified date. They also implement workarounds in code that allow Registry keys to be renamed, as the underlying APIs do not support this capability.

The Registry Editor allows users to perform the following functions: Creating, manipulating, renaming and deleting registry keys, subkeys, values and value data; importing and exporting .REG files, exporting data in the binary hive format; bookmarking user-selected registry keys as Favorites; finding particular strings in key names, value names and value data; and remotely editing the registry on another networked computer. These functions will be lost upon disabling regedit.exe and regedt32.exe. However, the Registry Editor is rarely if ever invoked by a user and its impact is expected to be negligible on OS performance, thus it is disabled at S351. Additionally, the Registry Editor troubleshooting tools regedit.exe and regedt32.exe are disabled at S351 because given access to the registry, a user could do a keyword search or browse the registry in search of the software that might be doing the blocking. They could possibly identify the content blocking software and knowing what it is, attempt to search for a method to disable, circumvent or uninstall it.

The command prompt, cmd.exe is the Microsoft-supplied command-line interpreter on OS/2, Windows CE and on Windows NT-based operating systems (including Windows 2000, XP, Vista, 7, Server 2003 and Server 2008). It is the analog of COMMAND.COM in MS-DOS. Since it is a Windows program that acts as a DOS-like command line interpreter, it is rarely used; thus disabling cmd.exe is expected to have minimal impact, thus it is disabled at S352. Additionally, command prompt tool cmd.exe is disabled at S352 because an advanced computer user could use it to run various system tools and commands in an attempt to identify and reverse engineer the steps taken to prevent the user from circumventing, uninstalling or disabling the content blocking software.

Local Group Policy (LGP) (secpol.msc) is a more basic version of the Group Policy used by Active Directory. A Group Policy in part controls what users can and cannot do on a computer system, for example: to enforce a password complexity policy that prevents users from choosing an overly simple password, to allow or prevent unidentified users from remote computers to connect to a network share, to block access to the Windows Task Manager or to restrict access to certain folders. A group of such configurations is called a Group Policy Object (GPO). Prior to Windows Vista, LGP could enforce a GPO for a single local computer, but could not make policies for individual users or groups. Windows Vista allows setting local Group Policy for individual users. The LGP tool is disabled at S353 so that an advanced computer user couldn't access LGP and alter or disable the GPOs put in place to prevent the user from compromising the content blocking software. LGP is also considered non-essential for the computer system 100, thus it is disabled at S353.

Windows Task Manager (taskmgr.exe) is a task manager application included with the Microsoft Windows® NT family of operating systems (including Windows® 7) that provides detailed information about computer performance and running applications, processes and CPU usage, commit charge and memory information, network activity and statistics, logged-in users, and system services. The Task Manager can also be used to set process priorities, processor affinity, forcibly terminate processes, and shut down, restart, hibernate or log off from Windows. Windows Task Manager was introduced with Windows® NT 4.0. The taskmgr.exe tool is disabled at S354 because it can provide insight and clues to the sophisticated computer user as to what may be filtering their internet access.

MSConfig (officially called System Configuration in Windows Vista and Windows 7 or Microsoft System Configuration Utility in previous operating systems) is a system utility to troubleshoot the Microsoft Windows startup process. The msconfig.exe tool can disable or re-enable software, device drivers and Windows services that run at startup, or change boot parameters. MSConfig is a troubleshooting tool. The main function of MSConfig is to temporarily disable or re-enable software, device drivers or Windows services that run during startup process to help user decide the cause of problem. Since this application could be used as part of an effort to disable or circumvent the content blocking software, it is disabled at S355.

On the Microsoft Windows operating system, the Run command is used to directly open an application or document whose path is known. It functions more or less like a single-line command line interface. The run command (run.exe) is disabled to prevent the user from executing or running applications that they may download externally which could help to try and disable and/or circumvent the blocking software on computer system 100, so as to be able to access illicit web sites.

Process Monitor is a free tool that monitors and displays in real-time all file system activity on a Microsoft Windows operating system. It combines two older tools, FileMon.exe and RegMon.exe and is used in system administration, computer forensics, and application debugging. Process Monitor monitors and records all actions attempted against the Microsoft Windows Registry. Process Monitor can be used to detect failed attempts to read and write registry keys. It also allows for filtering on specific keys, processes, process IDs, and values. In addition it shows how applications use files and DLLs, detects some critical errors in system files and more. The launching of this utility tool is prevented at S357 because it can be used by the savvy computer user to help figure out which applications(s) may be running on the computer that are preventing the user from accessing harmful web sites. Once they have identified what is doing the blocking, then they could research how they might be able to circumvent it.

Accordingly, the method 300 of preventing the disabling or circumventing of content blocking functionality provides a computer system 100 in which a user may enjoy viewing content online without fear of falling into illicit areas of content, and without allowing addictive tendencies to coerce them to attempt to disable the content blocking software therein; it will not be possible. Parents will be able to rest easy with the assurance that their children will not be able to be influence by any illicit content protected by the blocking software with inherent protections built therein.

The example embodiments being thus described, it will be obvious that the same may be varied in many ways. Such variations are not to be regarded as departure from the example embodiments, and all such modifications as would be obvious to one skilled in the art are intended to be included in the following claims herein.

I claim:

1. A computer system configured for preventing the disabling or circumventing of content blocking software functionality to be installed at time of manufacture therein, comprising:
   a housing, the housing enclosing a hard drive and a processor,
   operating system software stored on the hard drive and implemented by the processor,
   a display on which icons, features, lists and menus representative of executable programs of the operating system software are displayable,
   means for turning off system restore prior to installation of the content blocking software onto the computer system,
   means for hiding content blocking software-related features once the content blocking software is installed, wherein the means for hiding content blocking software-related features further includes:
      means for hiding the content blocking software from an add/remove programs list of executable programs that is part of the operating system software and displayable on the display,
      means for hiding a content blocking software installation directory that is part of the operating system software and displayable on the display, and
      means for hiding a tray icon for the content blocking software that is displayable on the display,
   means for preventing booting of the computer system from external sources,
   means for preventing modifying of BIOS settings of the computer system, and
   means for disabling selected advanced troubleshooting tools in the operating system software.

2. The system of claim 1, wherein means for disabling selected advanced troubleshooting tools in the operating system software includes:
   means for disabling Windows Registry Editor tools, denoted as executable files regedit.exe and regedt32.exe.

3. The system of claim 1, wherein means for disabling selected advanced troubleshooting tools in the operating system software includes:
   means for disabling a command prompt tool, denoted as executable file cmd.exe.

4. The system of claim 1, wherein means for disabling selected advanced troubleshooting tools in the operating system software includes:
   means for disabling a local group policy tool, denoted as file secpol.msc.

5. The system of claim 1, wherein means for disabling selected advanced troubleshooting tools in the operating system software includes:
   means for disabling a task manager tool, denoted as executable file taskmgr.exe.

6. The system of claim 1, wherein means for disabling selected advanced troubleshooting tools in the operating system software includes:
   means for disabling a system configuration tool, denoted as executable file msconfig.exe.

7. The system of claim 1, wherein means for disabling selected advanced troubleshooting tools in the operating system software includes:
   means for disabling a run command tool, denoted as executable file run.exe.

8. The system of claim 1, wherein means for disabling selected advanced troubleshooting tools in the operating system software includes:
   means for disabling a Process Monitor tool used in system administration, computer forensics, and application debugging.

9. In a computer system having a hard drive and a processor, operating system software stored on the hard drive and implemented by the processor, and a display on which icons, features, lists and menus representative of executable programs of the operating system software are displayable, a method for preventing the disabling or circumventing of content blocking software functionality to be installed in the computer system at time of manufacture, comprising:
   turning off system restore prior to installation of the content blocking software onto the computer system,
   hiding content blocking software-related features once the content blocking software is installed, wherein hiding the content blocking software-related features further includes:
      hiding the content blocking software from an add/remove programs list of executable programs that is part of the operating system software and displayable on the display,
      hiding a content blocking software installation directory that is part of the operating system software and displayable on the display, and
      hiding a tray icon for the content blocking software that is displayable on the display,
   preventing booting of the computer system from external sources,
   preventing modifying of BIOS settings of the computer system, and
   disabling selected advanced troubleshooting tools in the operating system software.

10. The method of claim 9, wherein disabling selected advanced troubleshooting tools in the operating system software includes:
    disabling Windows Registry Editor tools, denoted as executable files regedit.exe and regedt32.exe.

11. The method of claim 9, wherein disabling selected advanced troubleshooting tools in the operating system software includes:
    disabling a command prompt tool, denoted as executable file cmd.exe.

12. The method of claim 9, wherein disabling selected advanced troubleshooting tools in the operating system software includes:
    disabling a local group policy tool, denoted as file secpol.msc.

13. The method of claim 9, wherein disabling selected advanced troubleshooting tools in the operating system software includes:
    disabling a task manager tool, denoted as executable file taskmgr.exe.

14. The method of claim 9, wherein disabling selected advanced troubleshooting tools in the operating system software includes:
    disabling a system configuration tool, denoted as executable file msconfig.exe.

15. The method of claim 9, wherein disabling selected advanced troubleshooting tools in the operating system software includes:
    disabling a run command tool, denoted as executable file run.exe.

16. The method of claim 9, wherein disabling selected advanced troubleshooting tools in the operating system software includes:
    disabling a Process Monitor tool used in system administration, computer forensics, and application debugging.

* * * * *